(12) United States Patent
Shi et al.

(10) Patent No.: US 10,260,516 B2
(45) Date of Patent: Apr. 16, 2019

(54) TURBOCHARGER BEARING WITH IMPROVED DURABILITY AND NOISE REDUCTION

(71) Applicant: GM Global Technology Operations LLC, Detroit, MI (US)

(72) Inventors: Fanghui Shi, Bloomfield Hills, MI (US); Dingfeng Deng, Auburn Hills, MI (US); Ran Wu, Auburn Hills, MI (US); Louis P. Begin, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 419 days.

(21) Appl. No.: 15/159,420

(22) Filed: May 19, 2016

(65) Prior Publication Data

US 2017/0335864 A1   Nov. 23, 2017

(51) Int. Cl.
| | | |
|---|---|---|
| *F01D 25/16* | (2006.01) | |
| *F04D 29/056* | (2006.01) | |
| *F02M 26/04* | (2016.01) | |
| *F04D 17/10* | (2006.01) | |
| *F04D 29/42* | (2006.01) | |
| *F04D 29/66* | (2006.01) | |
| *F16C 25/00* | (2006.01) | |
| *F04D 29/057* | (2006.01) | |
| *F16C 17/24* | (2006.01) | |
| *F16C 17/26* | (2006.01) | |

(52) U.S. Cl.
CPC .......... *F04D 29/056* (2013.01); *F01D 25/16* (2013.01); *F02M 26/04* (2016.02); *F04D 17/10* (2013.01); *F04D 29/057* (2013.01); *F04D 29/4206* (2013.01); *F04D 29/663* (2013.01); *F16C 17/24* (2013.01); *F16C 17/26* (2013.01); *F16C 25/00* (2013.01); *F04D 29/668* (2013.01); *F05D 2220/40* (2013.01); *F05D 2240/50* (2013.01); *F16C 2360/24* (2013.01)

(58) Field of Classification Search
CPC ........ F01D 25/16; F04D 29/66; F04D 29/056; F05D 2240/50
See application file for complete search history.

(56) References Cited

U.S. PATENT DOCUMENTS

| | | | |
|---|---|---|---|
| 3,390,926 A * | 7/1968 | Woollenweber, Jr. | ........................ F01D 25/166 384/287 |
| 9,464,637 B2 | 10/2016 | Nguyen-Schaefer | |
| 9,599,149 B2 * | 3/2017 | Ryu | ......................... F01D 25/16 |
| 2012/0237149 A1 * | 9/2012 | Uesugi | .................. F01D 25/166 384/397 |

(Continued)

*Primary Examiner* — Ninh H. Nguyen
(74) *Attorney, Agent, or Firm* — Harness, Dickey & Pierce, P.L.C.

(57) ABSTRACT

A turbocharger includes a housing and a rotary assembly disposed within the housing and including a turbine wheel and a compressor wheel attached to one another by a shaft. A bearing is disposed in the housing and rotatably supports the shaft. The bearing includes a pair of inner bearing surfaces that engage opposite ends of the shaft and a pair of outer bearing surfaces that engage the housing. The pair of inner bearing surfaces have a first axial dimension and the pair of outer bearing surfaces have a second axial dimension that is smaller than the first axial dimension.

6 Claims, 4 Drawing Sheets

(56) References Cited

U.S. PATENT DOCUMENTS

2014/0219777 A1\* 8/2014 Uneura ................ F01D 25/186
                                                                                                         415/112
2017/0045085 A1\* 2/2017 Sugiura .................. F16C 17/02

\* cited by examiner

TURBOCHARGER BEARING WITH IMPROVED DURABILITY AND NOISE REDUCTION

FIELD

The present disclosure relates to turbochargers and more particularly to a bearing system with improved durability and noise reduction.

BACKGROUND AND SUMMARY

This section provides background information related to the present disclosure which is not necessarily prior art.

Internal combustion engines are used to generate considerable levels of power for prolonged periods of time on a dependable basis. Many such engine assemblies employ a boosting device, such as an exhaust gas turbine driven turbocharger, to compress the airflow before it enters the intake manifold of the engine in order to increase power and efficiency.

Specifically, a turbocharger utilizes a centrifugal gas compressor that forces more air and, thus, more oxygen into the combustion chambers of the engine than is otherwise achievable with ambient atmospheric pressure. The additional mass of oxygen-containing air that is forced into the engine improves the engine's volumetric efficiency, allowing it to burn more fuel in a given cycle, and thereby produce more power.

A typical turbocharger employs a central shaft that is supported by one or more bearings and transmits rotational motion between an exhaust-driven turbine wheel and an air compressor wheel. Both the turbine and compressor wheels are fixed to the shaft, which in combination with various bearing components constitute the turbocharger's rotating assembly.

Sub synchronous frequency vibration noise can be a concern in a turbocharger. The semi-floating or fully floating bearing according to the principles of the present disclosure is designed to minimize sub synchronous vibration. In conventional bearings as shown in FIG. 4, the bearing 1 includes a pair of inner bearing surfaces 2 that engage the turbocharger shaft 3 and a pair of outer bearing surfaces 4 that contact the turbocharger housing. The inner bearing surfaces 2 of the conventional bearing 1 have an axial dimension DI that is smaller than an axial dimension DO of the pair of outer bearing surfaces 4.

However, it is a discovery of the present application that a reduced outer bearing surface axial dimension relative to the inner bearing surface axial dimension can decrease sub-synchronous frequency vibrations. Accordingly, the present disclosure provides a turbocharger including a housing and a rotary assembly disposed within the housing and including a turbine wheel and a compressor wheel attached to one another by a shaft. A bearing is disposed in the housing and rotatably supports the shaft. The bearing includes a pair of inner bearing surfaces that engage opposite ends of the shaft and a pair of outer bearing surfaces that engage the housing. The pair of inner bearing surfaces have a first axial dimension and the pair of outer bearing surfaces have a second axial dimension that is smaller than the first axial dimension.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
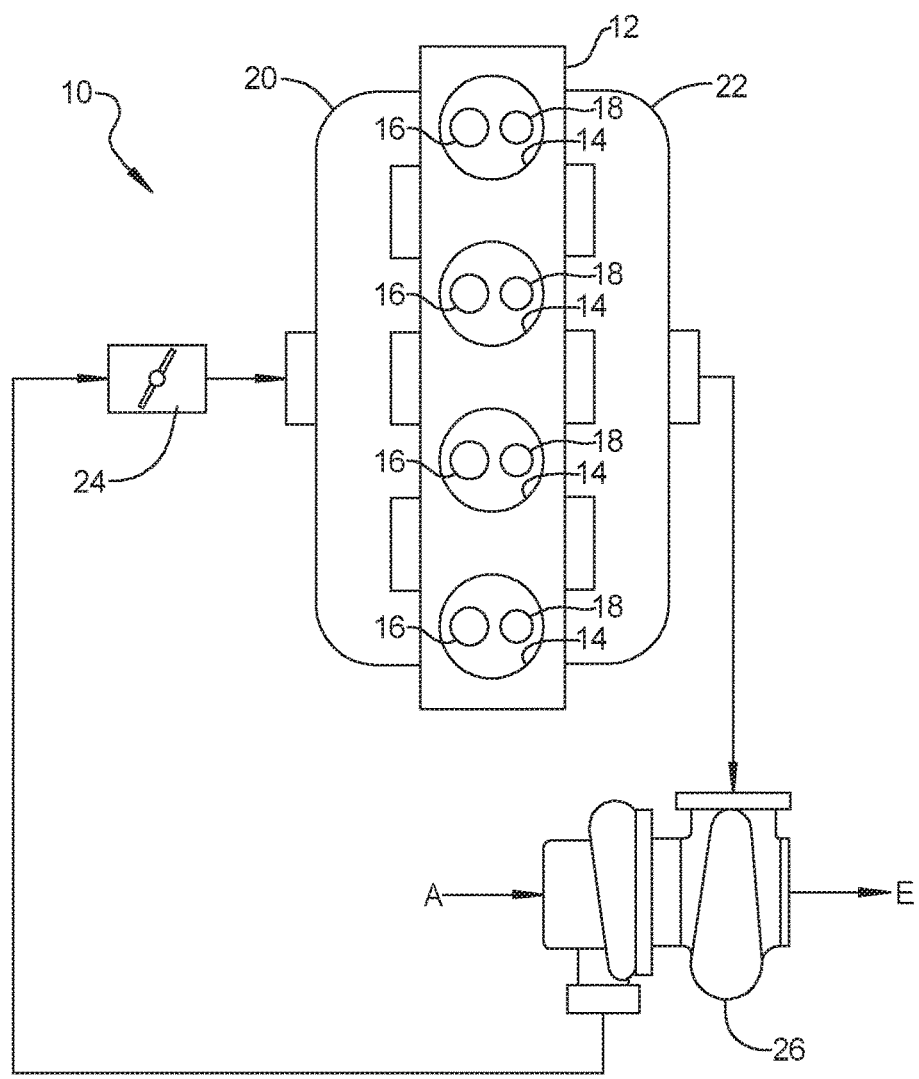
FIG. 1 is a schematic illustration of an engine assembly according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An engine assembly 10 is illustrated in FIG. 1 and may include an engine structure 12 defining a plurality of cylinders 14 and intake and exhaust ports 16, 18 in communication with the cylinders 14. An intake manifold 20 is in communication with the intake ports and an exhaust manifold 22 is in communication with the exhaust ports 18. A throttle valve 24 and a turbocharger 26 are provided in an intake passage that is connected to the intake manifold 20 and the turbocharger 26 is also in communication with an exhaust passage connected to the exhaust manifold 22. The engine assembly 10 is illustrated as an in-line four cylinder arrangement for simplicity. However, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

Figure 2:
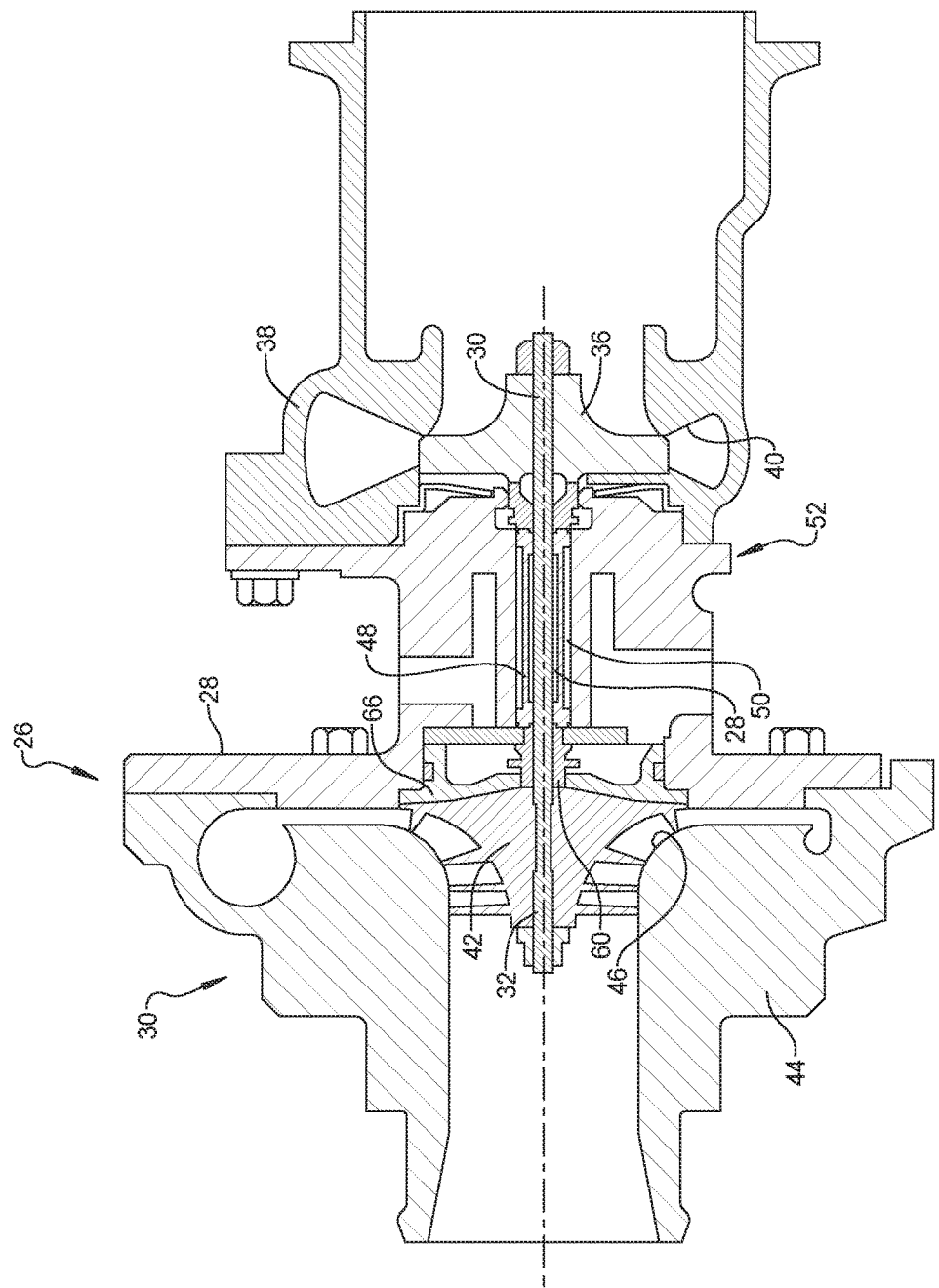
FIG. 2 is a schematic cross-sectional illustration of the turbocharger shown in FIG. 1.

As shown in FIG. 2, the turbocharger 26 includes a shaft 28 having a first end 30 and a second end 32. A turbine wheel 36 is mounted on the shaft 28 proximate to the first end 30 and configured to be rotated by combustion exhaust gasses emitted from the cylinders 14. The turbine wheel 36 is typically formed from a temperature and oxidation resistant material, such as a nickel-chromium-based "inconel" superalloy to reliably withstand temperatures of the combustion exhaust gasses which in some engines may approach 2,000 degrees Fahrenheit. The turbine wheel 36 is disposed inside a turbine housing 38 that includes a volute or scroll 40. The scroll 40 receives the combustion exhaust gases and directs the exhaust gases to the turbine wheel 36.

As further shown in FIG. 2, the turbocharger 26 also includes a compressor wheel 42 mounted on the shaft 28 proximate to the second end 32. The compressor wheel 42 is configured to pressurize the airflow being received from the ambient for eventual delivery to the cylinders 14. The compressor wheel 42 is disposed inside a compressor cover 44 that includes a volute or scroll 46. The scroll 46 receives the airflow and directs the airflow to the throttle valve 24 and the intake manifold 20. Accordingly, rotation is imparted to the shaft 28 by the combustion exhaust gases energizing the turbine wheel 36, and is in turn communicated to the compressor wheel 42.

Figure 3:
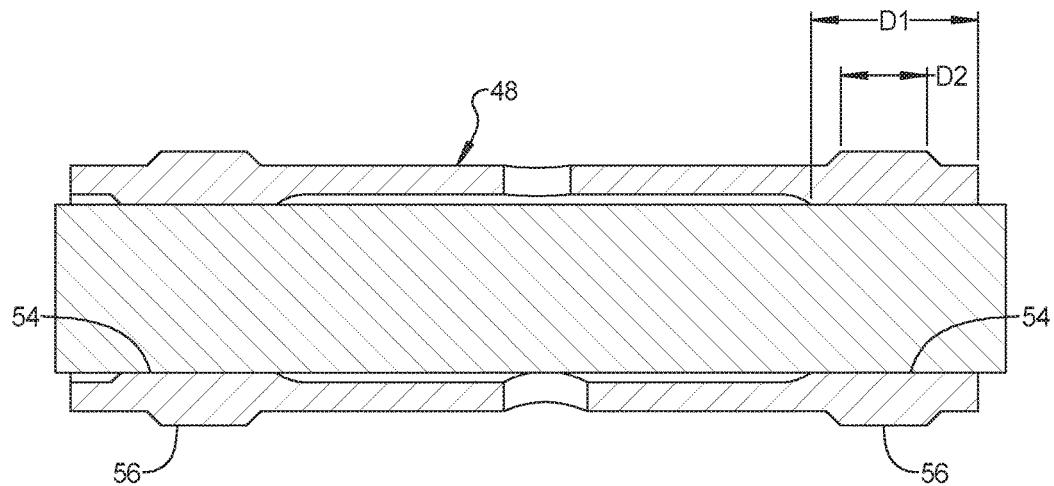
FIG. 3 is a cross-sectional view of the turbocharger bearing according to the principles of the present disclosure.
Figure 4:
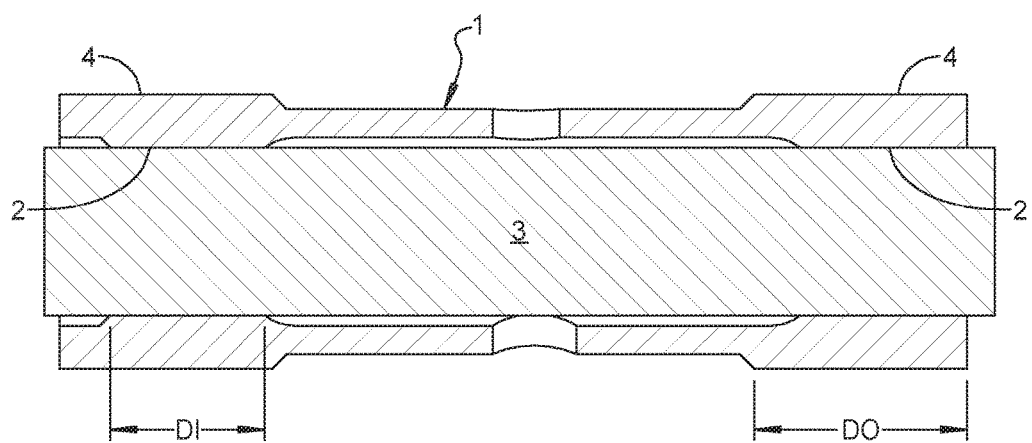
FIG. 4 is a cross-sectional view of a conventional turbo charger bearing.

With continued reference to FIG. 2, the shaft 28 is supported for rotation via a bearing 48. The bearing 48 is mounted in a bore 50 of a bearing housing 52 and is lubricated and cooled by a supply of pressurized engine oil. As shown in FIG. 3, the bearing 48 includes a pair of inner bearing surfaces 54 that contact the shaft 28 and a pair of outer bearing surfaces 56 that contact the bore 50 of the housing 52. The pair of inner bearing surfaces 54 have an axial dimension D1 and the outer bearing surfaces 56 have an axial dimension D2 which is smaller than the axial dimension D1. The axial dimension D2 of the outer bearing surfaces 56 can preferably be 90 percent or smaller of the axial dimension D1 of the inner bearing surfaces 54. The bearing 48 can be a semi-floating (non-rotating) or fully floating (rotating) type.

Figure 5:
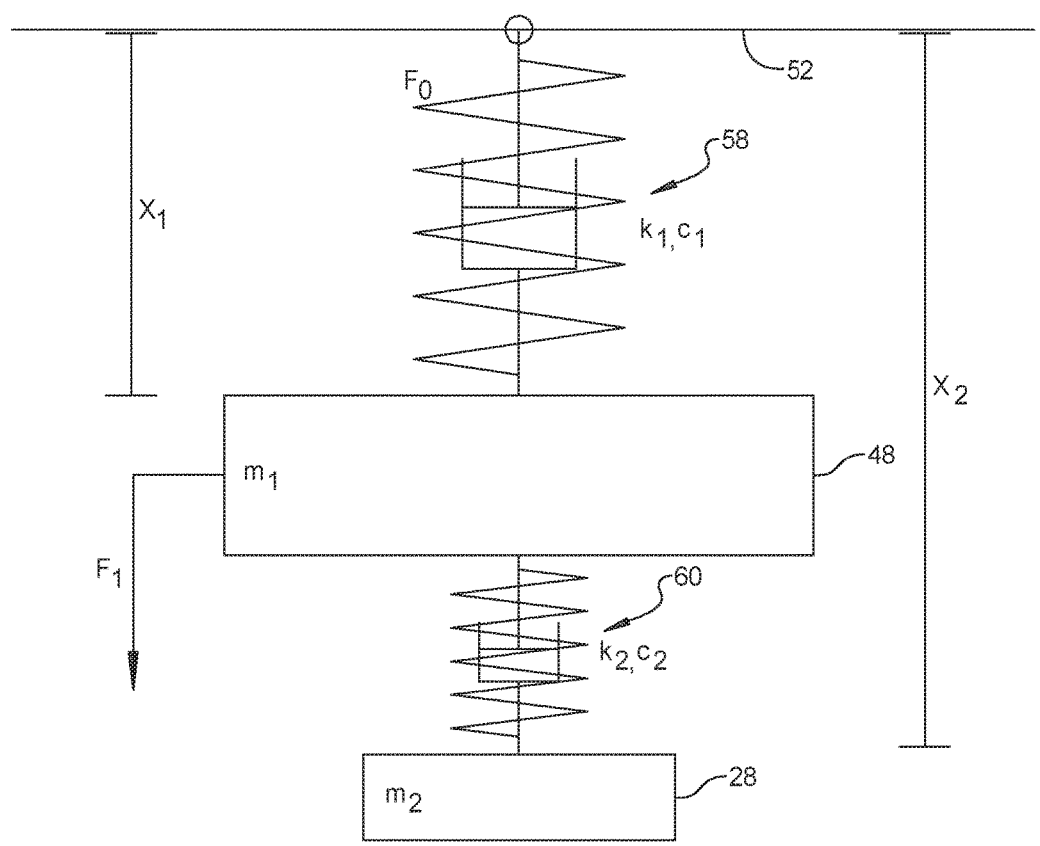
FIG. 5 is a spring and damper model diagram of the turbocharger bearing.

The effect of the relative reduced axial dimension D2 of the outer bearing surfaces 56 of the bearing 48 can be modeled by a mass-spring-damper system as illustrated in FIG. 5. In the diagram of FIG. 5, the bearing 48 is shown with a spring and damper system representing an oil film 58 between the bearing 48 and the housing 52 and with a spring and damper system representing the oil film 60 between the bearing 48 and the shaft 28. The spring and damper systems 58, 60 are represented by spring constants $k_1$, $k_2$ and damping coefficients $c_1$, $c_2$. When the turbocharger 26 does a speed ramp-up, the self-induced oil whirl in the inner film 60 will excite the rotor-dynamic natural frequency (called sub-2 conical model), the magnitude of the vibration $X_2$ and force $F_1$ depends on the interaction between the spring constants and damping coefficients $k_1$, $c_1$ and $k_2$, $c_2$ which are governed by the bearing design. The reduced axial dimension of the outer film 58 reduces the $k_1$, $c_1$ and numerically proves to be able to significantly reduce the vibration of the shaft and the interaction force between the bearing 48 and the shaft 28.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A turbocharger, comprising:
a housing;
a rotary assembly disposed within the housing and including a turbine wheel and a compressor wheel attached to one another by a shaft; and
a one-piece bearing sleeve disposed in the housing and rotatably supporting the shaft, the one-piece bearing sleeve including a pair of inner bearing surfaces that engage opposite ends of the shaft and a pair of outer bearing surfaces that engage the housing, the pair of inner bearing surfaces having a first axial dimension and the pair of outer bearing surfaces having a second axial dimension that is smaller than the first axial dimension, wherein each end of the pair of inner bearing surfaces extend axially beyond each end of the pair of outer bearing surfaces.

2. The turbocharger according to claim 1, wherein the second axial dimension is smaller than 90% of the first axial dimension.

3. The turbocharger according to claim 1, wherein the one-piece bearing sleeve is a semi-floating bearing.

4. The turbocharger according to claim 1, wherein the one-piece bearing sleeve is a fully floating bearing.

5. A bearing, comprising: a one-piece generally cylindrical sleeve including a pair of inner bearing surfaces adapted to engage opposite ends of a shaft and a pair of outer bearing surfaces adapted to engage a bore in a housing, the pair of inner bearing surfaces having a first axial dimension and the pair of outer bearing surfaces having a second axial dimension that is smaller than the first axial dimension, wherein each end of the pair of inner bearing surfaces extend axially beyond each end of the pair of outer bearing surfaces.

6. The bearing according to claim 5, wherein the second axial dimension is smaller than 90% of the first axial dimension.

\* \* \* \* \*